US011672030B2

(12) United States Patent
Kobayashi et al.

(10) Patent No.: US 11,672,030 B2
(45) Date of Patent: Jun. 6, 2023

(54) CONTROL METHOD, ON-VEHICLE DEVICE, AND STORAGE MEDIUM

(71) Applicant: HONDA MOTOR CO., LTD., Tokyo (JP)

(72) Inventors: Shinichi Kobayashi, Tokyo (JP); Naoto Furuyama, Tokyo (JP); Daiki Kawase, Tokyo (JP); Yuki Tanaka, Tokyo (JP); Ryosuke Asafuji, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 17/353,854

(22) Filed: Jun. 22, 2021

(65) Prior Publication Data
US 2021/0410204 A1 Dec. 30, 2021

(30) Foreign Application Priority Data
Jun. 25, 2020 (JP) .............................. JP2020-109281

(51) Int. Cl.
*H04W 76/10* (2018.01)
*H04W 4/80* (2018.01)
(Continued)

(52) U.S. Cl.
CPC ........ *H04W 76/10* (2018.02); *G06F 13/4282* (2013.01); *H04W 4/40* (2018.02); *H04W 4/80* (2018.02); *G06F 2213/0042* (2013.01)

(58) Field of Classification Search
CPC ..................................................... H04W 4/80
See application file for complete search history.

(56) References Cited

U.S. PATENT DOCUMENTS

| 10,708,863 | B1* | 7/2020 | Hor-Lao | ............ H04W 52/0245 |
| 2010/0095026 | A1* | 4/2010 | Nagai | ...................... H04L 69/18 |
| | | | | 710/16 |

(Continued)

FOREIGN PATENT DOCUMENTS

JP          5498332         5/2014

*Primary Examiner* — Wen W Huang
(74) *Attorney, Agent, or Firm* — Amin, Turocy & Watson, LLP

(57) ABSTRACT

A control method of an embodiment is a control process in which, based on management information of a first execution order that is an execution order of a hands free profile (HFP) connection process of attempting to establish an HFP connection to a pre-registered peripheral device and a second execution order that is an execution order of an audio video profile (AVP) connection process of attempting to establish an AVP connection to the peripheral device, an on-vehicle device connectable to the peripheral device by Bluetooth performs the HFP connection process in the first execution order and performs the AVP connection process in the second execution order, and when a connection with a certain peripheral device is not established within a predetermined time in one of the HFP connection process and the AVP connection process and the peripheral device is managed as an execution target of the other connection process in the management information, the on-vehicle device determines whether to restrain execution of the other connection process for the peripheral device thereafter.

9 Claims, 8 Drawing Sheets

(51) Int. Cl.
 *G06F 13/42* (2006.01)
 *H04W 4/40* (2018.01)

(56) References Cited

U.S. PATENT DOCUMENTS

| | | | |
|---|---|---|---|
| 2012/0071097 A1* | 3/2012 | Matsushita | H04M 1/6091 |
| | | | 455/41.2 |
| 2013/0095753 A1* | 4/2013 | Chen | H04B 7/00 |
| | | | 455/41.1 |
| 2014/0087665 A1* | 3/2014 | Yang | H04W 8/005 |
| | | | 455/41.2 |
| 2016/0150588 A1* | 5/2016 | Yae | H04W 76/14 |
| | | | 455/41.2 |
| 2018/0077558 A1* | 3/2018 | Ichikawa | H04L 67/51 |
| 2018/0098368 A1* | 4/2018 | Wu | H04W 4/80 |

\* cited by examiner

FIG. 4

| MANAGEMENT TARGET GROUP | CONNECTION ORDER | DEVICE ID | CONNECTION FORM | SKIP FLAG | |
|---|---|---|---|---|---|
| | | | | BT_SKIP | USB_SKIP |
| HFP/WCP/WAA | 1 | HFP_DEV#1 | Phone | 0 | 0 |
| | 2 | HFP_DEV#2 | WCP | 1 | 0 |
| | 3 | HFP_DEV#3 | Phone | 1 | 0 |
| | 4 | HFP_DEV#4 | WAA | 0 | 0 |
| | 5 | HFP_DEV#5 | WCP | 0 | 1 |
| | 6 | HFP_DEV#6 | WCP | 0 | 0 |
| AVP | 1 | AVP_DEV#1 | — | — | — |
| | 2 | AVP_DEV#2 | — | — | — |
| | 3 | AVP_DEV#3 | — | — | — |
| | 4 | AVP_DEV#4 | — | — | — |
| | 5 | AVP_DEV#5 | — | — | — |
| | 6 | AVP_DEV#6 | — | — | — |

CONTROL METHOD, ON-VEHICLE DEVICE, AND STORAGE MEDIUM

CROSS-REFERENCE TO RELATED APPLICATION

This application is based upon and claims the benefit of priority from Japanese Patent Application No. 2020-109281, filed Jun. 25, 2020, the entire content of which is incorporated herein by reference.

BACKGROUND

Field of the Invention

The present invention relates to a control method, an on-vehicle device, and a storage medium.

Description of Related Art

In the related art, there is an on-vehicle device capable of establishing a communication connection with peripheral devices by Bluetooth (registered trademark). As a control method of such an on-vehicle device, there is a technology of judging in a predetermined order whether to perform a process of establishing a connection with pre-registered peripheral devices (for example, see Japanese Patent No. 5498332).

SUMMARY

However, in the control method of the on-vehicle device according to the related art, since the establishment of a connection with all registered peripheral devices is sequentially attempted for each Bluetooth profile, the standby time at the time of connecting the peripheral devices may be increased.

The present invention is achieved in view of the problems described above, and one object of the present invention is to provide a control method, an on-vehicle device, and a storage medium, by which it is possible to shorten the time required for establishing a Bluetooth connection.

A control method, an on-vehicle device, and a storage medium according to the invention employ the following configurations.

(1) A control method according to an aspect of the invention is a control method, in which a computer serving as an on-vehicle device connectable to a pre-registered peripheral device by Bluetooth executes a program, includes steps of: based on management information of a first execution order that is an execution order of a hands free profile (HFP) connection process of attempting to establish an HFP connection to the peripheral device and a second execution order that is an execution order of an audio video profile (AVP) connection process of attempting to establish an AVP connection to the peripheral device, performing a control process of performing the HFP connection process in the first execution order and the AVP connection process in the second execution order; and when a connection with a certain peripheral device is not established within a predetermined time in one of the HFP connection process and the AVP connection process in the control process and the peripheral device is managed as an execution target of the other connection process in the management information, judging whether to restrain the execution of the other connection process for the peripheral device thereafter.

(2) In the above aspect (1), the computer determines whether to restrain the execution of the other connection process, based on a behavior of the peripheral device at the time of execution of an HFP connection process or an AVP connection process that has failed to establish a connection.

(3) In the above aspect (2), when there is no response from a peripheral device having attempted a connection at the time of the execution of the HFP connection process or the AVP connection process that has failed to establish the connection, the computer determines to restrain the execution of the other connection process for the peripheral device thereafter, and when a connection is rejected by the peripheral device or a connection established once is disconnected by the peripheral device at the time of the execution, the computer determines not to restrain the execution of the other connection process thereafter.

(4) In the above aspects (1) to (3), the computer repeatedly performs the HFP connection process and the AVP connection process for a plurality of peripheral devices in an execution order managed by the management information, and releases restraint of the execution of the other connection process every cycle of the repetition.

(5) In the above aspects (1) to (4), the on-vehicle device further includes a universal serial bus (USB) connector that is connected to the peripheral device by USB, and in a case where a connection with a peripheral device by the USB connector is disconnected, when the peripheral device has been registered in the management information as an execution target of at least one of the HFP connection process and the AVP connection process, the computer restrains the execution of at least one of the HFP connection process and the AVP connection process, which is to be executed, thereafter.

(6) In the above aspects (1) to (5), an execution order of the HFP connection process and the AVP connection process is managed in the order of peripheral devices whose connection history with the on-vehicle device is new.

(7) In the above aspects (4) to (6), the computer performs the AVP connection process subsequent to the HFP connection process for a peripheral device, which first performs the HFP connection process, in each cycle of the repetition, or performs the HFP connection process subsequent to the AVP connection process for a peripheral device, which first performs the AVP connection process, in each cycle of the repetition.

(8) An on-vehicle device according to an aspect of the invention is an on-vehicle device, which is connectable to a pre-registered peripheral device by Bluetooth, includes a storage device that stores a program, and a hardware processor, wherein the hardware processor executes the program stored in the storage device, thereby allowing the on-vehicle device to, based on management information of a first execution order that is an execution order of an HFP connection process of attempting to establish an HFP connection to the peripheral device and a second execution order that is an execution order of an AVP connection process of attempting to establish an AVP connection to the peripheral device, perform a control process of performing the HFP connection process in the first execution order and the AVP connection process in the second execution order, and when a connection with a certain peripheral device is not established within a predetermined time in one of the HFP connection process and the AVP connection process in the control process and the peripheral device is managed as an execution target of the other connection process in the management information, judging whether to restrain the execution of the other connection process for the peripheral device thereafter.

(9) A storage medium according to an aspect of the invention is a non-transitory computer readable storing medium storing a program causing a computer serving as an on-vehicle device connectable to a pre-registered peripheral device by Bluetooth to, based on management information of a first execution order that is an execution order of a hands free profile (HFP) connection process of attempting to establish an HFP connection to the peripheral device and a second execution order that is an execution order of an audio video profile (AVP) connection process of attempting to establish an AVP connection to the peripheral device, perform a control process of performing the HFP connection process in the first execution order and the AVP connection process in the second execution order; and when a connection with a certain peripheral device is not established within a predetermined time in one of the HFP connection process and the AVP connection process in the control process and the peripheral device is managed as an execution target of the other connection process in the management information, determine whether to restrain the execution of the other connection process for the peripheral device thereafter.

According to the aspects (1), (8), and (9), when the connection with the certain peripheral device is not established within the predetermined time in one of the HFP connection process and the AVP connection process and the peripheral device is managed as an execution target of the other connection process in the management information, it is determined whether to restrain the execution of the other connection process for the peripheral device thereafter, so that it is possible to shorten the time required for establishing a Bluetooth connection.

According to the aspects (2) or (3), the on-vehicle device determines whether to restrain the execution of the process of establishing the other connection, based on the behavior of the peripheral device at the time of execution of the HFP connection process or the AVP connection process that has failed to establish a connection, so that it is possible to restrain the connection process of a peripheral device that has failed to establish a connection from being skipped more than necessary.

According to the aspect (4), the on-vehicle device repeatedly performs the HFP connection process and the AVP connection process for a plurality of peripheral devices in a predetermined connection order and releases the restraint of the execution of the process of establishing the other connection every cycle of the repetition, so that it is possible to avoid the connection process of a peripheral device once determined to be skipped from being continuously skipped thereafter.

According to the aspect (5), in the case where the connection with the peripheral device by the USB connector is disconnected, when the peripheral device has been registered in the management information as an execution target of at least one of the HFP connection process and the AVP connection process, the on-vehicle device restrains the execution of at least one of the HFP connection process and the AVP connection process, which is to be executed, thereafter, so that it is possible to further reduce the possibility that an unnecessary connection process will be performed.

According to the aspect (6), the execution order of the HFP connection process and the AVP connection process is managed in the order of peripheral devices whose connection history with the on-vehicle device is new, so that it is possible to shorten the time required for establishing a Bluetooth connection when the execution order of the connection process is determined based on the connection history.

According to the aspect (7), the on-vehicle device performs the AVP connection process subsequent to the HFP connection process for the peripheral device, which first performs the HFP connection process, in each cycle of the repetition or performs the HFP connection process subsequent to the AVP connection process for the peripheral device, which first performs the AVP connection process, in each cycle of the repetition, so that it is possible to further shorten the time required for establishing an AVP connection or an HFP connection with peripheral device with the latest connection history.

BRIEF DESCRIPTION OF THE DRAWINGS

FIG. 4 is a diagram showing a specific example of a connection history management table in the present embodiment.

DESCRIPTION OF EMBODIMENTS

Hereinafter, an embodiment of a control method, an on-vehicle device, and a storage medium of the present invention will be described with reference to the drawings. As used throughout this disclosure, the singular forms "a", "an", and "the" include pluralities unless the context clearly dictates otherwise.

Hereinafter, an embodiment, in which the present invention is applied to a Bluetooth (hereinafter, referred to as BT)-compatible on-vehicle device (hereinafter, referred to as "on-vehicle device") having a BT communication function, will be described with reference to the drawings. Here, the following description will be provided for a case where a peripheral device having a BT communication function is brought into a vehicle interior of a vehicle provided with the on-vehicle device and the on-vehicle device and the peripheral device perform BT communication.

Figure 1:
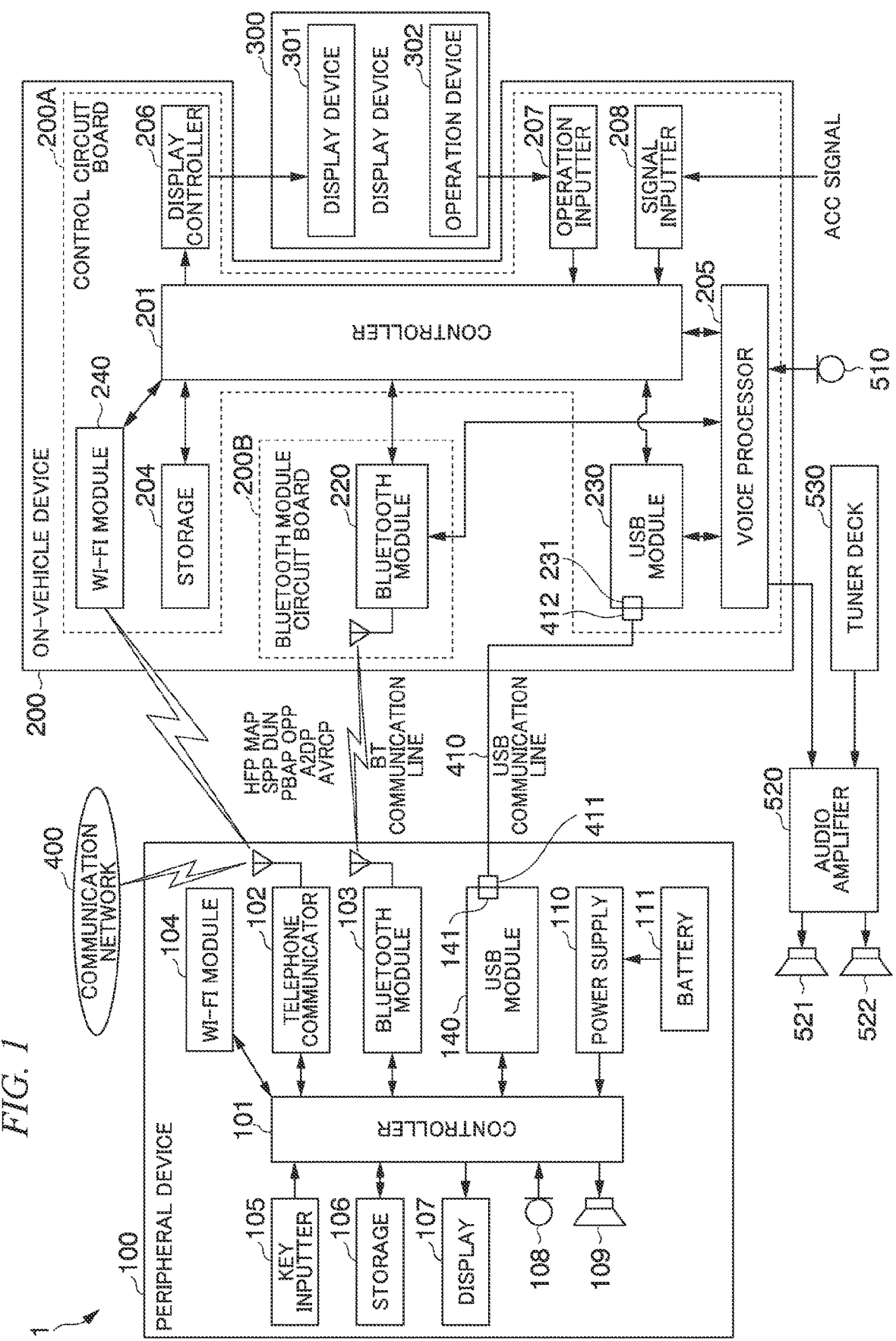
FIG. 1 is a diagram showing a specific example of a system configuration of a BT communication system in the present embodiment.

FIG. 1 is a diagram showing a specific example of a system configuration of a BT communication system 1 in the present embodiment. The BT communication system 1 includes a peripheral device 100 and an on-vehicle device 200 mounted on a vehicle. The peripheral device 100 is, for example, a portable terminal device having a BT communication function such as a smart phone and a tablet terminal.

For example, the peripheral device 100 includes a controller 101, a telephone communicator 102, a BT module 103, a Wi-Fi (registered trademark) module 104, a USB module 140, a key inputter 105, a storage 106, a display 107, a microphone 108, a speaker 109, and a power supply 110.

The controller 101 includes a central processing unit (CPU), a random access memory (RAM), a read only memory (ROM), an I/O bus, and the like, and controls all operations such as a communication operation, a data management operation, and the like of the peripheral device 100.

The telephone communicator 102 performs telephone communication with a communication network 400. The communication network 400 includes equipment for providing a mobile phone communication service of a mobile phone base station, a base station controller, and the like.

The BT module 103 has a function of establishing a communication connection for BT communication (hereinafter, referred to as BT connection) for each profile defined in a BT communication standard between the peripheral device 100 and a BT module 220 of the on-vehicle device 200 described above, and performs BT communication via the established BT connection for each profile. The profile is a communication protocol defined for each function in the BT. The BT module 103 is configured to enable so-called multi-connection, which simultaneously establishes a plurality of BT connections by different profiles.

For example, the profile of the BT includes a hands free profile (HFP) that defines hands-free communication, a message access profile (MAP) that defines the transfer of electronic mail data, a serial port profile (SPP) that defines virtual serial port data communication, a dial-up networking profile (DUN) that defines a dial-up connection to the Internet, a phone book access profile (PBAP) that defines the transfer of phone book data, an object push profile (OPP) that also defines the transfer of phone book data, an advanced audio distribution profile (A2DP) that defines the transfer of audio data, an audio/video remote control profile (AVRCP) that defines the transfer of control data related to the control of audio data, and the like. The A2DP and the AVRCP are also generically referred as audio/video profile (AVP).

The Wi-Fi module 104 is a wireless communication interface that provides a Wi-Fi communication function using radio waves of, for example, 2.4 GHz band or 5 GHz band. The Wi-Fi module 104 performs Wi-Fi communication with the on-vehicle device 200.

The USB module 140 has a connection terminal 141 from which a connection terminal 411 of a USB connection cable 410 is detachable. In a state in which one connection terminal 412 of the USB connection cable 410 is connected to a connection terminal 231 of a USB module 230 of the on-vehicle device 200 and the other connection terminal 411 of the USB connection cable 410 is connected to the connection terminal 141, the USB module 140 has a function of establishing a communication connection for USB communication (hereinafter, referred to as USB connection) between the peripheral device 100 and the USB module 230 of the on-vehicle device 200 and performs the USB communication via the established USB connection.

The key inputter 105 includes various keys that can be operated by a user and outputs an operation signal indicating the operation to the controller 101 in response to the key operation of the user. The controller 101 analyzes the operation signal input from the key inputter 105 and specifies the operation of the user.

The storage 106 is configured using a magnetic storage device such as a hard disk drive (HDD), or a semiconductor storage device such as a solid state drive (SSD) and a flash memory. The storage 106 is used as a storage area of various data.

The display 107 has a function of displaying various display screens based on a display signal input from the controller 101. The controller 101 has a function of performing voice processing on transmission voice data input from the microphone 108 and allowing the speaker 109 to output reception voice data, which is input from the telephone communicator 102, as voice. The power supply 110 uses power, which is discharged from a battery 111 detachable to a body, as operating power and provides the operating power to each function unit.

For example, the on-vehicle device 200 includes a controller 201, the BT module 220 (example of an HFP connector and an AVP connector), the universal serial bus (USB) module 230 (example of a USB connector), a Wi-Fi module 240, a storage 204, a voice processor 205, a display controller 206, an operation inputter 207, and a signal inputter 208. For example, the controller 201, the USB module 230, the Wi-Fi module 240, the storage 204, the voice processor 205, the display controller 206, the operation inputter 207, and the signal inputter 208 are physically mounted on a control circuit board 200A, and the BT module 220 may be physically mounted on a BT module circuit board 200B, which is a member separate from the control circuit board 200A, or may be mounted on the same board as the control circuit board 200A.

Each of the controller 201, the BT module 220, the USB module 230, the Wi-Fi module 240, the voice processor 205, and the display controller 206 is implemented by, for example, a hardware processor such as a CPU executing a program (software). Some or all of these components may be implemented by hardware (a circuit unit: including a circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory or may be installed when a detachable storage medium (non-transitory storage medium) storing the program, such as a DVD and a CD-ROM, is mounted on a drive device.

Figure 2:
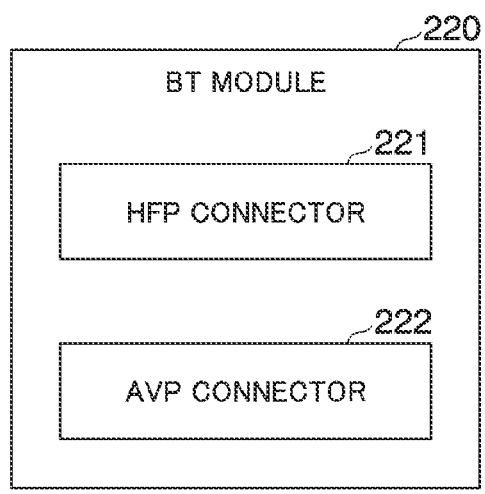
FIG. 2 is a diagram showing a specific example of a functional configuration of a BT module in the present embodiment.

The controller 201 controls all operations such as a communication operation, a data management operation, and the like of the on-vehicle device 200. The BT module 220 has a function of connecting a BT communication line between the BT module 220 and the BT module 103 of the peripheral device 100 and performing BT communication via the BT communication line. It is assumed that the BT module 220 supports BT communication with the same profile as that of the BT module 103 of the peripheral device 100. FIG. 2 is a diagram showing a specific example of a functional configuration of the BT module 103. The BT module 220 includes an HFP connector 221 and an AVP connector 222.

The USB module 230 has a connection terminal 231 from which a connection terminal 412 of the USB connection cable 410 is detachable. In a state in which the one connection terminal 412 of the USB connection cable 410 is connected to the connection terminal 231 and the other connection terminal 411 of the USB connection cable 410 is connected to the connection terminal 141 of the USB module 140 of the peripheral device 100, the USB module 230 has a function of connecting a USB communication line between the USB module 230 and the USB module 140 of the peripheral device 100 and performing USB communication via the USB communication line.

The Wi-Fi module 240 is a wireless communication interface that provides a Wi-Fi communication function using radio waves of, for example, 2.4 GHz band or 5 GHz band. The Wi-Fi module 240 performs Wi-Fi communication with the peripheral device 100.

The storage 204 is configured using a magnetic storage device such as an HDD, or a semiconductor storage device such as an SSD and a flash memory. The storage 204 is used as a storage area of various data. For example, in a state in which the BT module 220 has been connected to the BT module 103 of the peripheral device 100 by the MAP, the storage 204 stores electric mail data transferred from the peripheral device 100 to the BT module 220 (sender information capable of identifying the destination of an electric mail, reception date and time information capable of identifying the date and time when an electric mail has been received by a mobile phone 3, type information capable of identifying the type of an electric mail, for example, subject information capable of identifying the subject of an electric mail input by a sender, and the like).

For example, in a state in which the BT module 220 has been connected to the BT module of the peripheral device 100 by the PBAP, the storage 204 stores phone book data transferred from the peripheral device 100 to the BT module 220, outgoing history data representing correspondence between the outgoing time and the outgoing telephone number related to an outgoing operation from the on-vehicle device 200 or an outgoing operation from the peripheral device 100 connected to the on-vehicle device 200 by the HFP, incoming history data representing correspondence between the incoming time and the incoming telephone number related to an incoming operation of the peripheral device 100 connected to the on-vehicle device 200 by the HFP, and the like.

A microphone 510 and an audio amplifier 520 are connected to the voice processor 205. The microphone 510 is arranged in a position of a vehicle interior where it is easy to collect voice uttered from the user, for example, in the vicinity of a steering wheel. The audio amplifier 520 is arranged outside the on-vehicle device 200. Speakers 521 and 522 are connected to the audio amplifier 520.

In a state in which the BT module 220 and the BT module 103 of the peripheral device 100 have been connected by the HFP, when the voice uttered from the user is input from the microphone 510 as transmission voice data, the voice processor 205 performs voice processing on the input transmission voice data and outputs the processed data to the BT module 220. When reception voice data is input from the BT module 220, the voice processor 205 outputs the input reception voice data to the audio amplifier 520.

In a state in which the BT module 220 and the BT module 103 of the peripheral device 100 have been connected by the AVP (A2DP and AVRCP), the voice processor 205 outputs, to the audio amplifier 520, sound data transferred from the BT module 103 of the peripheral device 100 to the BT module 220. In a state in which the USB module 230 and the USB module 140 of the peripheral device 100 have been connected by the USB, the voice processor 205 outputs, to the audio amplifier 520, sound data transferred from the USB module 140 of the peripheral device 100 to the USB module 230.

When the reception voice data and the sound data are input from the voice processor 205, the audio amplifier 520 amplifies the input reception voice data and sound data and outputs the amplified data through the speakers 521 and 522.

The audio amplifier 520 is also connected to a tuner deck 530, and when the tuner deck 530 inputs music data reproduced from, for example, a music recording medium, the audio amplifier 520 amplifies the input music data and outputs the amplified data through the speakers 521 and 522.

A display device 300 includes a display device 301 that displays various display screens and an operation device 302 that forms a touch switch on the display screen. When a display signal is input from the controller 201, the display controller 206 controls a display operation of the display device 301 in the display device 300 based on the input display signal. When an operation signal is input from the operation device 302 in response to a user operation of the touch switch formed on the display screen, the operation inputter 207 outputs the input operation signal to the controller 201, and the controller 201 analyzes the operation signal input from the operation inputter 207 and specifies the user operation.

The signal inputter 208 is connected to, for example, an accessory (ACC) switch mounted on the vehicle. When an ACC signal is input from the ACC switch, the signal inputter 208 outputs the input ACC signal to the controller 201. The controller 201 turns on or off a device power supply based on the on/off of the ACC signal input from the signal inputter 208. That is, the controller 201 turns on the device power supply at the timing at which the ACC signal transitions from off to on (starts the on-vehicle device 200) and turns off the device power supply at the timing at which the ACC signal transitions from on to off (stops the on-vehicle device 200).

The on-vehicle device 200 configured as described above can perform the following two operations as the operation of the BT module 103 when the BT module 220 transmits a profile connection request signal to the BT module 103, depending on the specifications of the BT module 103, which is a data communication partner of the BT module 220, and a profile type.

(1) When the BT module 103 automatically transmits, to the BT module 220, a profile connection permission response signal for permitting a connection request of the profile or a profile connection rejection response signal for rejecting the connection request of the profile.

(2) When the BT module 103 transmits the profile connection permission response signal or connection rejection response signal to the BT module 220 under the condition that the user has operated the peripheral device 100.

A profile in which the BT module 103 automatically transmits the profile connection permission response signal or connection rejection response signal to the BT module 220 includes, for example, the HFP, the SPP, and the like. A profile in which the BT module 103 transmits the profile connection permission response signal or connection rejection response signal to the BT module 220 under the condition that the user has operated the peripheral device 100 includes, for example, PBAP, DUN, and the like. These settings are determined by a manufacturer of the peripheral device 100, for example, from the viewpoint of protection of personal information, billing, and the like. These settings may be changed after the user of the peripheral device 100 purchases the peripheral device 100.

Under these circumstances, the BT module 220 and the BT module 103 connect the profile as follows. In the on-vehicle device 200, when the connection request of the profile is generated in a state in which the BT communication line has been connected between the BT module 220 and the BT module 103, the controller 201 allows the BT module 220 to transmit the profile connection request signal to the BT module 103 via the BT communication line.

In the peripheral device 100, when it is determined that the BT module 103 has received the profile connection request signal from the BT module 220 via the BT communication line, the controller 101 determines the type of the profile having requested a connection (hereinafter, referred to as "request profile"). When the peripheral device 100 supports the request profile, the controller 101 allows the BT module 103 to transmit the profile connection permission response signal to the BT module 220 via the BT communication line. More specifically, when the request profile is a profile that automatically transmits the profile connection permission response signal or connection rejection response signal to the on-vehicle device 200 and it is determined that the profile is connectable, the controller 101 allows the BT module 103 to transmit the profile connection permission response signal. On the other hand, when the peripheral device 100 does not support the request profile, that is, when it is determined that the profile is not connectable, the controller 101 allows the BT module 103 to transmit to transmit the profile connection rejection response signal to the BT module 220 via the BT communication line.

When it is determined that the request profile is a profile that transmits the profile connection permission response signal or connection rejection response signal to the on-vehicle device 200 under the condition that the user has operated the peripheral device 100, the controller 101 allows the display 107 to display a connection possibility inquiry screen (not illustrated) for inquiring of the user about whether to permit or reject the connection of the profile. When it is determined that the user has performed an operation of permitting the connection of the request profile by the key inputter 105, the controller 101 allows the BT module 103 to transmit the profile connection permission response signal to the BT module 220 via the BT communication line. On the other hand, when it is determined that the user has performed an operation of rejecting the connection of the profile by the key inputter 105, the controller 101 allows the BT module 103 to transmit the profile connection rejection response signal to the BT module 220 via the BT communication line.

In the on-vehicle device 200, when it is determined that the BT module 220 has received the profile connection permission response signal from the BT module 103 via the BT communication line, the controller 201 starts a profile connection process. When the connection request is permitted and the profile connection process is ended normally, the controller 201 establishes the connection of the request profile between the BT module 220 and the BT module 103. On the other hand, when it is determined that the BT module 220 has received the profile connection rejection response signal from the BT module 103 via the BT communication line or a predetermined time has elapsed without receiving a signal by the BT module 220 after the profile connection request signal is transmitted, the controller 201 does not start the profile connection process.

So far, the basic configuration of the BT communication system 1 including the on-vehicle device 200 having the BT communication function and the peripheral device 100 has been described. In addition to such a basic configuration, the on-vehicle device 200 of the present embodiment includes a configuration to more efficiently establish a profile connection. In the related art, there is a history connection as one method for efficiently establishing a profile connection. The history connection is a method in which a profile connection process is performed for peripheral devices 100, which have been connected in the past, in order from those with a new connection history. According to such a history connection, a peripheral device 100 with a new connection history can quickly establish a profile connection with the on-vehicle device 200.

However, in the history connection according to the related art, since a profile connection process for all peripheral devices 100 managed as targets of the history connection is collectively performed for each profile, a profile connection process of a preceding profile may cause a profile connection process of a subsequent profile to have to wait, whereby establishing the connection of the subsequent profile may take a long time.

On the other hand, the on-vehicle device 200 of the present embodiment has a configuration for restraining the execution of a subsequent profile connection process for part or all of peripheral devices 100 having not been able to establish a profile connection in the history connection. By employing such a configuration, the on-vehicle device 200 of the present embodiment can shorten the time required for establishing the BT connection in the history connection. Hereinafter, such a configuration of the on-vehicle device 200 of the embodiment will be described in detail.

FIG. 1 shows the peripheral device 100 as an example of a peripheral device capable of establishing the profile connection with the on-vehicle device 200; however, this is not intended to mean that a configuration of a peripheral device that establishes a profile connection with the on-vehicle device 200 is not limited to the configuration of the peripheral device 100. It is sufficient if a peripheral device that communicates with the on-vehicle device 200 in the BT communication system 1 of the embodiment is a device having a BT communication function equivalent to that of the peripheral device 100.

FIG. 1 shows the peripheral device 100 as an example of a peripheral device that can be connected to the on-vehicle device 200 by the USB; however, this is not intended to mean that a peripheral device USB-connected to the on-vehicle device 200 should have a BT communication function and a peripheral device profile-connected to the on-vehicle device 200 should have a USB communication function. The on-vehicle device 200 can also establish a profile connection of the BT and a USB connection with different peripheral devices.

Figure 3:
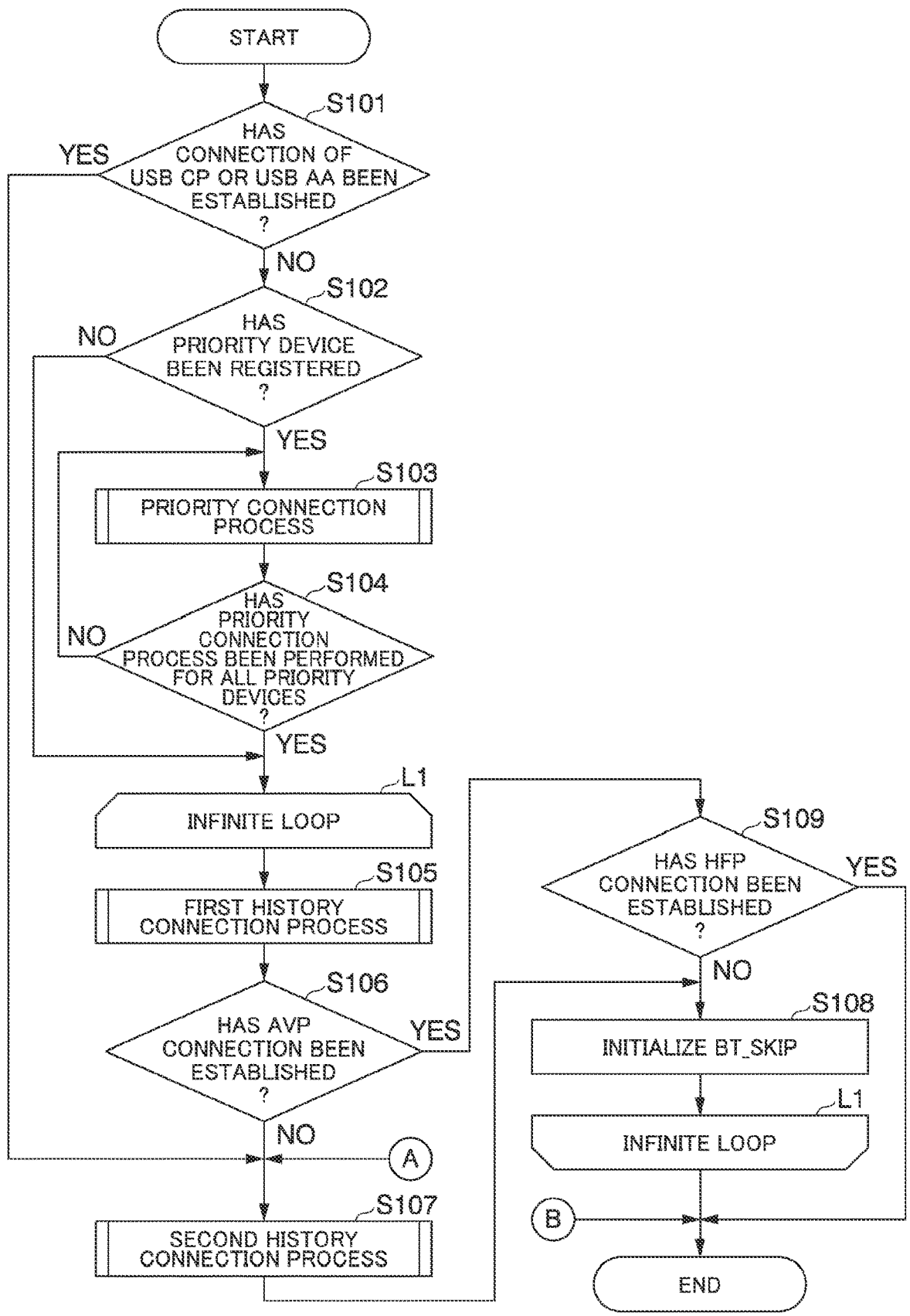
FIG. 3 is a flowchart showing a specific example of a method in which an on-vehicle device of the present embodiment controls a profile connection process of Bluetooth by a history connection.

FIG. 3 is a flowchart showing a specific example of a method in which the on-vehicle device 200 of the present embodiment controls a profile connection process of the BT by a history connection. Hereinafter, the following description will be provided for a case where the on-vehicle device 200 controls profile connection processes of the HFP and the AVP by the history connection. In such a case, it is assumed that the on-vehicle device 200 manages the connection history of peripheral devices by a predetermined connection history management table. FIG. 4 is a diagram showing a specific example of the connection history management table in the present embodiment.

For example, the connection history management table is composed of records having values of a management target group, a connection order, a device ID, a connection form, and a skip flag. The management target group is a value represented by a combination of one or more connection forms managed in groups with the same connection history and has a role as identification information of the management target group. In the example of FIG. 4, two management target groups are defined: a group that manages the connection history of the HFP, wireless CP (WCP), and wireless AA (WAA), and a group that manages the connection history of the AVP. Hereinafter, for the sake of simplicity, the management target group for managing the connection history of the HFP, the WCP, and the WAA is referred to as an HFP group, and the management target group for managing the connection history of the AVP is referred to as an AVP group.

The above CP is an abbreviation for "Apple CarPlay" (registered trademark), and the WCP means a CP in which compatible devices are connected by wireless communication. Similarly, the above AA is an abbreviation for "Android Auto" (registered trademark), and the WAA means an AA in which compatible devices are connected by wireless communication. On the other hand, it is hereinafter assumed that the CP and the AA in which compatible devices are connected by USB will be described as USB CP and USB AA, respectively.

The connection order represents an execution order of the profile connection process for a peripheral device to be a target of the history connection (hereinafter, referred to as "target device"). The connection order is managed for each management table. FIG. 4 shows the connection history management table in the case of managing first to sixth connection orders for each of the HFP group and the AVP group. FIG. 4 shows an example in which the first to sixth connection orders are management targets of the history connection from in order from those with a new connection history; however, a range in which the target device is managed is not limited to this example and may be arbitrarily changed.

The device ID is identification information of peripheral devices to be managed. The device ID may be any information as long as it can uniquely identify the peripheral devices to be managed. The device ID is appropriately updated according to the update of the connection history so that the newer the connection history, the faster the connection order.

The connection form represents a form of a connection that a peripheral device has established with the on-vehicle device 200 in the connection history. The example of FIG. 4 represents that a connection with peripheral devices identified with deviceDEV=2, 5, and 6 is the WCP and a connection with peripheral devices identified with device-DEV=4 is the WAA. The example of FIG. 4 represents that a connection with peripheral devices identified with device-DEV=1, and 3 is a connection with a telephone (phone). In this way, the connection form may be represented by a profile name of an established connection or may be represented by attributes of a peripheral device that has established a connection.

The skip flag is a flag used to determine whether to omit (hereinafter, referred to as "skip") part or the whole of the profile connection process for a peripheral device to be a target of the history connection (hereinafter, referred to as "target device"). An arbitrary number of skip flags may be provided according to conditions for skipping the profile connection process. The skip flag is appropriately updated according to a connection status between the on-vehicle device 200 and the peripheral device, an execution result of the profile connection, and the like.

For example, FIG. 4 shows an example in which two types of skip flags of BT_SKIP and USB_SKIP are provided. In such an example, a value of 0 represents that the profile connection process is not skipped and a value of 1 represents that the profile connection process is skipped. Here, the BT_SKIP is a skip flag set according to the execution result of the profile connection process.

On the other hand, the USB_SKIP is a skip flag set according to the status of the USB connection between the on-vehicle device 200 and the peripheral device. For example, when the USB connection between the on-vehicle device 200 and the peripheral device is used by the USB CP or the USB AA, it is conceivable that the user will be unlikely to disconnect the USB connection and intentionally switch the USB connection to the WCP or the WAA. Therefore, there is a case where the profile connection process of the BT may be skipped for a peripheral device that has already established the USB connection with the on-vehicle device 200 and is using the USB CP or the USB AA via the USB connection. The USB_SKIP is a skip flag used to skip the profile connection process in such a status and is appropriately updated according to the status of the USB connection with the peripheral device.

The judgment condition regarding whether to skip the profile connection process (hereinafter, referred to as "skip condition") may be represented by one of the BT_SKIP and the USB_SKIP, or may be represented by a combination of the BT_SKIP and the USB_SKIP. The skip condition may be represented by a combination of at least one of the BT_SKIP and the USB_SKIP and other judgment conditions.

The controller 201 of the on-vehicle device 200 controls the profile connection process shown in FIG. 3 while managing the connection history by such a connection history management table. First, the controller 201 determines whether a peripheral device supporting the USB CP or the USB AA has been USB-connected to the on-vehicle device 200 via the USB module 230 (step S101). When it is determined in step S101 that a CP-compatible device or an AA-compatible device has been USB-connected to the on-vehicle device 200, the controller 201 proceeds to step S107 without performing a priority connection process and a first history connection process, and performs a second history connection process.

Here, the priority connection process is a process of preferentially performing the profile connection process for a predetermined peripheral device. On the other hand, the first history connection process is a history connection process mainly for a profile connection process of the HFP (hereinafter, referred to as "HFP connection process"), and the second history connection process is a history connection process mainly for a profile connection process of the AVP (hereinafter, referred to as "AVP connection process"). Performing the second history connection process without performing the priority connection process and the first history connection process when the determination result in step S101 is YES is because it is conceivable that the user will be unlikely to intentionally switch the USB connection to the HFP connection when the CP-compatible device or the AA-compatible device has been USB-connected to the on-vehicle device 200.

On the other hand, when it is determined in step S101 that neither the CP-compatible device nor the AA-compatible device has been USB-connected to the on-vehicle device 200, the controller 201 determines whether a device to be a target of the priority connection process (hereinafter, referred to as "priority device") has been registered (step S102). When it is determined in step S102 that the priority device has been registered, the controller 201 proceeds to step S103 and performs the priority connection process.

Next, the controller 201 determines whether the priority connection process has been performed for all registered priority devices (step S104). When it is determined in step S104 that the priority connection process has not been performed for any of the registered priority devices, the controller 201 returns to step S102 and repeatedly performs the priority connection process. On the other hand, when it is determined that the priority connection process has been performed for all the registered priority devices, the controller 201 proceeds to an infinite loop L1. When it is determined in step S102 that the priority device has not been registered, the controller 201 proceeds to the infinite loop L1 without performing the priority connection process. The infinite loop L1 is an example of a periodic process in which the HFP connection process and the AVP connection process are repeatedly performed.

Inside the infinite loop L1, the controller 201 first performs the first history connection process (step S105). As described above, the first history connection process is a process in which the HFP connection process is mainly performed for the target device of the history connection. In the first history connection process, the controller 201 performs the HFP connection process for target devices managed in the HFP group in order from those with a fast connection order. With this, an HFP-based profile connection (hereinafter, referred to as "HFP connection") is established between the on-vehicle device 200 and the target device.

Next, the controller 201 determines whether the on-vehicle device 200 has established an AVP-based profile connection (hereinafter, referred to as "AVP connection") with any of the peripheral devices (step S106). When it is determined in step S106 that the on-vehicle device 200 has not established the AVP connection with any of the peripheral devices, the controller 201 performs the second history connection process (step S107). When the second history connection process is ended, the controller 201 initializes the BT_SKIP (step S108) and returns to the beginning of the infinite loop L1. The timing for initializing the BT_SKIP is not necessarily limited to the timing shown in the drawing, and the initialization may be performed at an arbitrary timing as long as it is possible to avoid the connection process of a target device that has been determined to be skipped once from being continuously skipped thereafter. The initialization of the skip flag corresponds to releasing the restraint of the execution of the profile connection process.

On the other hand, when it is determined in step S106 that the on-vehicle device 200 has established the AVP connection with any of the peripheral devices, the controller 201 determines whether the on-vehicle device 200 has established the HFP connection with any of the peripheral devices (step S109). When it is determined in step S109 that the on-vehicle device 200 has established the HFP connection with any of the peripheral devices, since it is not necessary to further establish the HFP connection and the AVP connection with the on-vehicle device 200, the controller 201 breaks the infinite loop L1 and ends a series of processes.

On the other hand, when it is determined in step S109 that the on-vehicle device 200 has not established the HFP connection with any of the peripheral devices, the controller 201 initializes the BT_SKIP (step S108) and returns to the beginning of the infinite loop L1. In this way, since the infinite loop L1 is continued until the on-vehicle device 200 establishes both the HFP connection and the AVP connection, it is possible to establish an unestablished profile connection at any time according to a request of the target device when the on-vehicle device 200 has established either the HFP connection or the AVP connection with the target device or the priority device.

In such priority connection process and history connection process, the on-vehicle device 200 of the embodiment determines whether to skip part or the whole of a subsequent profile connection process based on the status of a communication connection with a peripheral device, the execution result of the profile connection process, and the like and sets the skip flag based on the judgment result. With this, it is possible to restrain the execution of a profile connection process, which is not always highly necessary, and to reduce the standby time until a profile connection process is performed for a target device with a late connection order. Hereinafter, a method for setting the skip flag will be described in detail. Furthermore, for convenience, the entire flowchart including the priority connection process and the history connection process shown in FIG. 3 is hereinafter referred to as a "main process".

Figure 5:
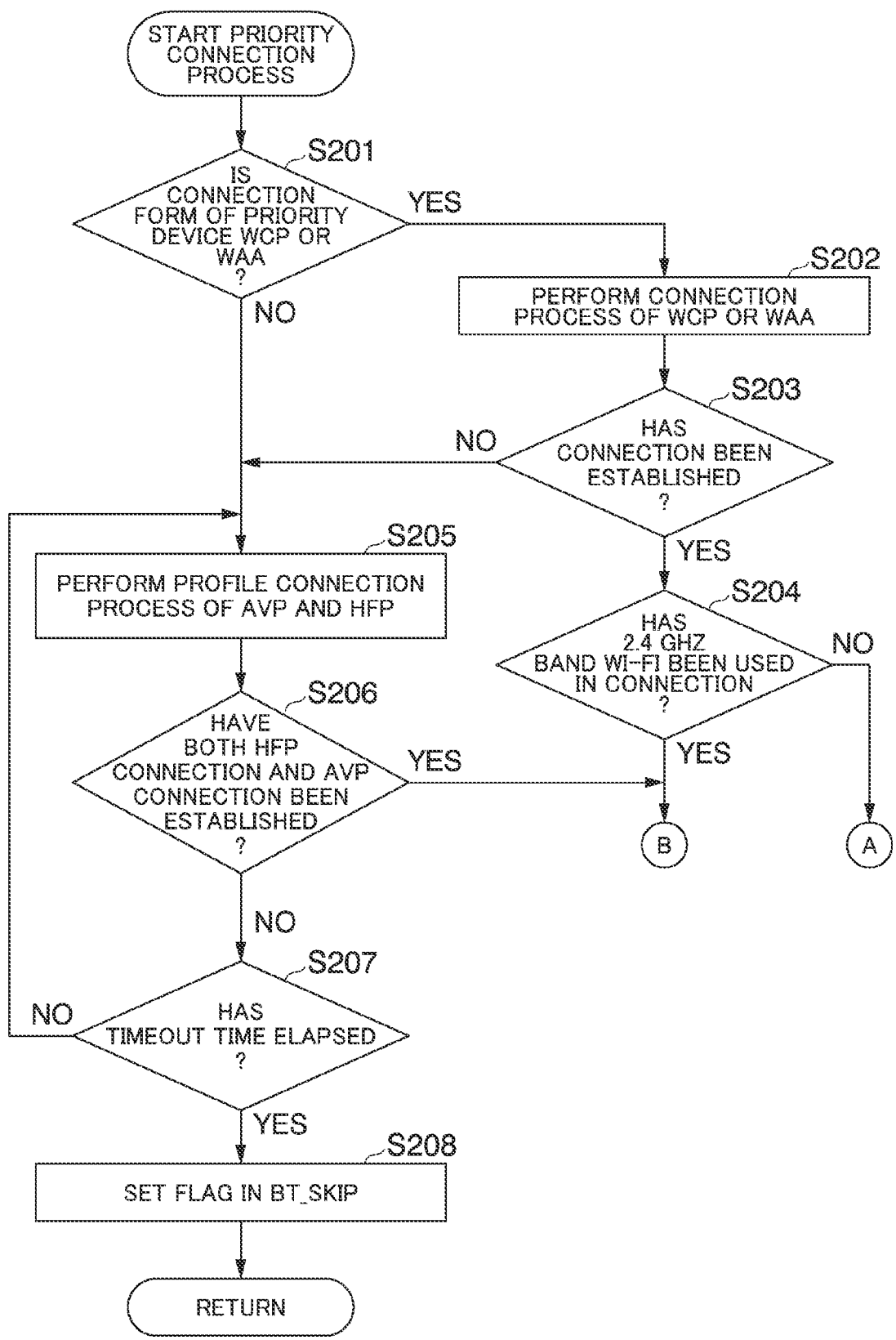
FIG. 5 is a flowchart showing a specific example of a priority connection process in the present embodiment.

FIG. 5 is a flowchart showing a specific example of the priority connection process in the present embodiment. In the priority connection process, the controller 201 first determines whether the connection form of the priority device is the WCP or the WAA (step S201). Specifically, it is assumed that the connection form of the priority device is managed by a predetermined management table as in the connection history management table. The controller 201 refers to the management table of the priority device and determines whether the connection form of a registered priority device is the WCP or the WAA.

When it is determined in step S201 that the connection form of the priority device is the WCP or the WAA, the controller 201 performs the connection process of the WCP or the WAA for the priority device (step S202). Next, the controller 201 determines whether the connection of the WCP or the WAA has been established between the priority device and the on-vehicle device 200 (step S203). When it is determined in step S203 that the connection of the WCP or the WAA has been established between the priority device and the on-vehicle device 200, the controller 201 determines whether 2.4 GHz band Wi-Fi has been used in the WCP connection or the WAA connection (step S204).

When it is determined in step S204 that the 2.4 GHz band Wi-Fi has been used in the WCP connection or the WAA connection with the priority device, the controller 201 ends the main process. A connection letter B in the drawing corresponds to a connection letter B in FIG. 3. In such a case, the main process is ended because it is conceivable that, when the CP-compatible device or the AA-compatible device has been Wi-Fi-connected to the on-vehicle device 200, the user will be unlikely to intentionally switch the Wi-Fi connection to the profile connection. Since the radio waves of the BT interfere with those of the 2.4 GHz band Wi-Fi, one of the reasons for this is that it is conceivable that there is little need to use the 2.4 GHz band Wi-Fi and the BT at the same time. In the WCP connection or the WAA connection, when the connection is made by the 2.4 GHz band Wi-Fi, audio control of a connected target device is also possible by the function of the WCP connection or the WAA connection.

On the other hand, when it is determined in step S204 that the 2.4 GHz band Wi-Fi has not been used in the WCP connection or the WAA connection with the priority device, the controller 201 proceeds to step S107 in FIG. 3 and performs the second history connection process. A connection letter A in the drawing corresponds to a connection letter A in FIG. 3. This is because, when the WCP connection or the WAA connection has been established without using the 2.4 GHz band Wi-Fi, there is a possibility that an AVP connection will be established at another terminal without interfering with the 2.4 GHz band Wi-Fi.

When it is determined in step S201 that the connection form of the priority device is not the WCP or the WAA, or when it is determined in step S203 that the WCP connection or the WAA connection has not been established between the priority device and the on-vehicle device 200, the controller 201 performs the HFP and AVP connection processes for the priority device (step S205), and determines whether both the HFP connection and the AVP connection have been established through the HFP and AVP connection processes (step S206). When it is determined in step S206 that both the HFP connection and the AVP connection have been established, the controller 201 ends the main process.

On the other hand, when it is determined in step S206 that at least one of the HFP connection and the AVP connection has not been established, the controller 201 determines whether a predetermined timeout time has elapsed (step S207), and repeatedly performs step S205 and step S206 until the timeout time elapses. On the other hand, when it is determined in step S207 that the timeout time has elapsed, the controller 201 sets a flag in the BT_SKIP for the priority device (step S208) and ends the priority connection process. Specifically, in such a case, the controller 201 sets the value of the BT_SKIP to 1. The timing of starting the counting of the timeout time is not limited to a specific timing as long as it is a timing after step S201. Setting the skip flag is equivalent to restraining the execution of a subsequent profile connection process.

So far, the flow of the priority connection process has been described. Subsequently, the flow of the history connection process will be described.

Figure 6:
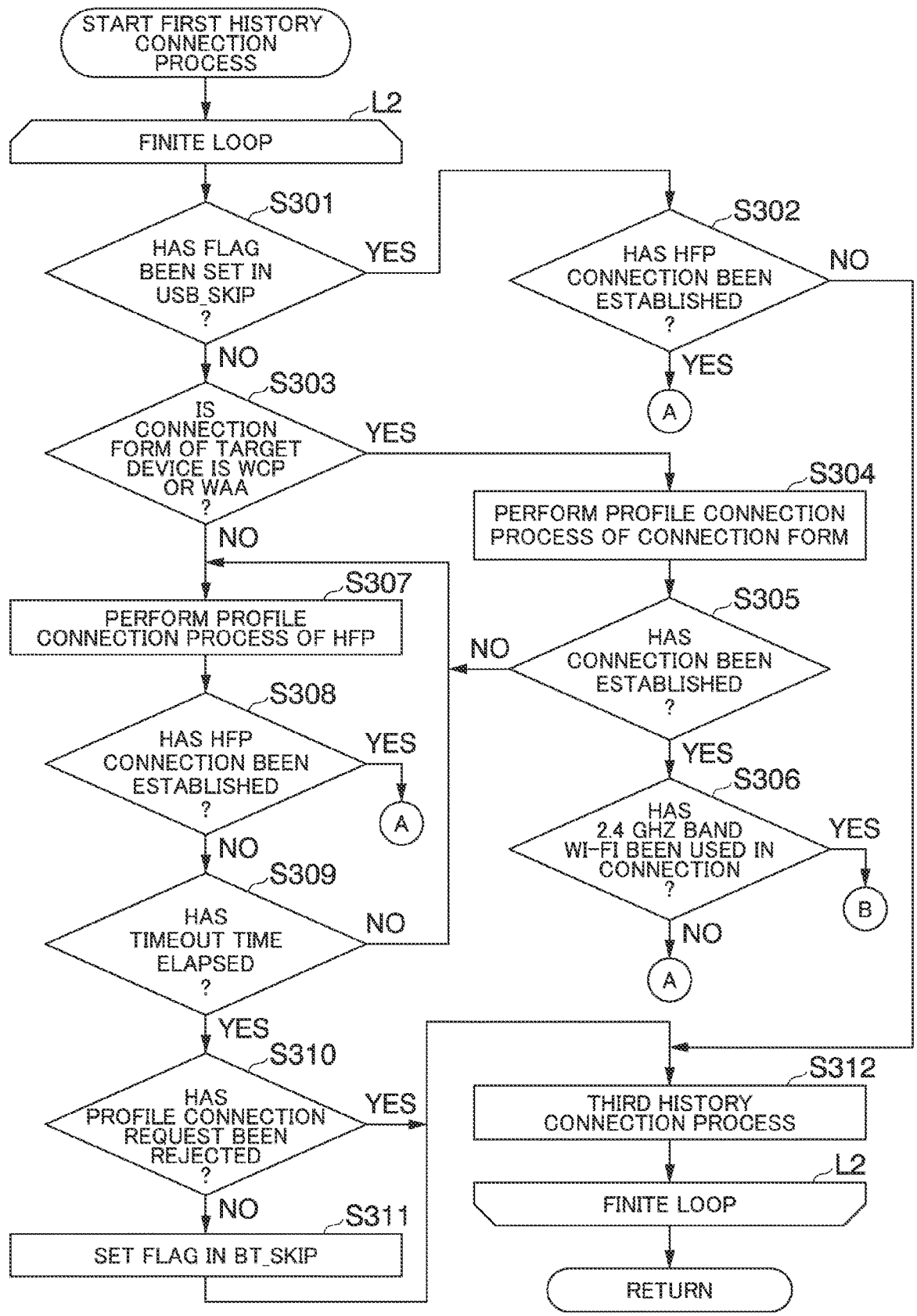
FIG. 6 is a flowchart showing a specific example of a first history connection process in the present embodiment.

FIG. 6 is a flowchart showing a specific example of the first history connection process in the present embodiment. As shown in FIG. 6, the first history connection process is a process in which iterative processes of step S301 to step S312 are performed sequentially from a target device with a fast connection order (finite loop L2). The target device of the first history connection process is a target device managed by the HFP group in the connection history management table.

First, the controller 201 determines whether a flag has been set in the USB_SKIP for the target device (step S301). When it is determined in step S301 that the flag has been set in the USB_SKIP, the controller 201 determines whether the HFP connection has been established with the target device (step S302). When it is determined in step S302 that the HFP connection has been established with the target device, the controller 201 skips a subsequent profile connection process, proceeds to step S107 in FIG. 3 and performs the second history connection process. A connection letter A in the drawing corresponds to the connection letter A in FIG. 3.

The USB_SKIP may be appropriately changed according to the status of the USB connection in the on-vehicle device 200. For example, when the USB connection with a peripheral device is disconnected, in a case where the peripheral device is managed as a target device in at least one of the HFP group and the AVP group, the controller 201 may set a flag in the USB_SKIP of a corresponding BT device so that at least one the HFP connection process and the AVP connection process performed for the peripheral device is skipped thereafter.

On the other hand, when it is determined in step S302 that the HFP connection has not been established with the target device, the controller 201 skips the HFP connection for the target device and performs a third history connection process (step S312). Here, as described above, the first history connection process is a process in which the HFP connection process is mainly performed for the target device, and the second history connection process is a process in which the AVP connection process is performed for the target device. Therefore, in the history connection of the present embodiment, the HFP connection process is basically performed before the AVP connection process and the time required until the AVP connection is established tends to be long. The third history connection process is a process for restraining the time required for establishing such a AVP connection from becoming long, and is a process of performing part of the history connection process of the AVP in the first history connection process. Since the third history connection process will be described with reference to FIG. 7, a further description thereof will be omitted here.

When it is determined in step S301 that the flag has not been set in the USB_SKIP for the target device, the controller 201 determines whether the connection form of the target device is the WCP or the WAA (step S303). When it is determined in step S303 that the connection form of the target device is the WCP or the WAA, the controller 201 performs steps S304 to S306 similar to steps S202 to S204 in the priority connection process. That is, the controller 201 performs a process of replacing the priority device with the target device in steps S202 to S204 as steps S304 to S306.

On the other hand, when it is determined in step S303 that the connection form of the target device is not the WCP or the WAA or when it is determined in step S305 that the profile connection of the WCP or the WAA has not been established between the target device and the on-vehicle device 200, the controller 201 performs the HFP connection process for the target device (step S307) and determines whether the HFP connection has been established (step S308). When it is determined in step S308 that the HFP connection has been established, the controller 201 ends the first history connection process and proceeds to the second history connection process.

On the other hand, when it is determined in step S308 that the HFP connection has not been established, the controller 201 determines whether a predetermined timeout time has elapsed (step S309), and repeatedly performs step S307 and step S308 until the timeout time elapses. On the other hand, when it is determined in step S309 that the timeout time has elapsed, the controller 201 determines whether a profile connection request for the target device has been rejected in an HFP connection process (step S307) performed the most recently (step S310). This is an operation for confirming whether the reason why the HFP connection has not been established between the on-vehicle device 200 and the target device is due to the absence of the target device or the behavior of the target device at the time of executing the HFP connection process. The rejection operation here also includes that a connection established once is disconnected by the target device.

When it is determined in step S310 that the profile connection request has not been rejected by the target device, that is, when the failure of the HFP connection establishment is due to the absence of the target device, it can be expected that a subsequent profile connection process for the target device would also fail. Therefore, in such a case, the controller 201 sets a flag in the BT_SKIP for the target device (step S311), and then proceeds to the third history connection process (step S312). Specifically, in such a case, the controller 201 sets the value of the BT_SKIP to 1. On the other hand, when it is determined in step S310 that the profile connection request has been rejected by the target device, that is, when the failure of the HFP connection establishment is caused by the target device, there is a possibility that a subsequent profile connection process for the target device will succeed. Therefore, in such a case, the controller 201 proceeds to the third history connection process without setting a flag in the BT_SKIP.

Figure 7:
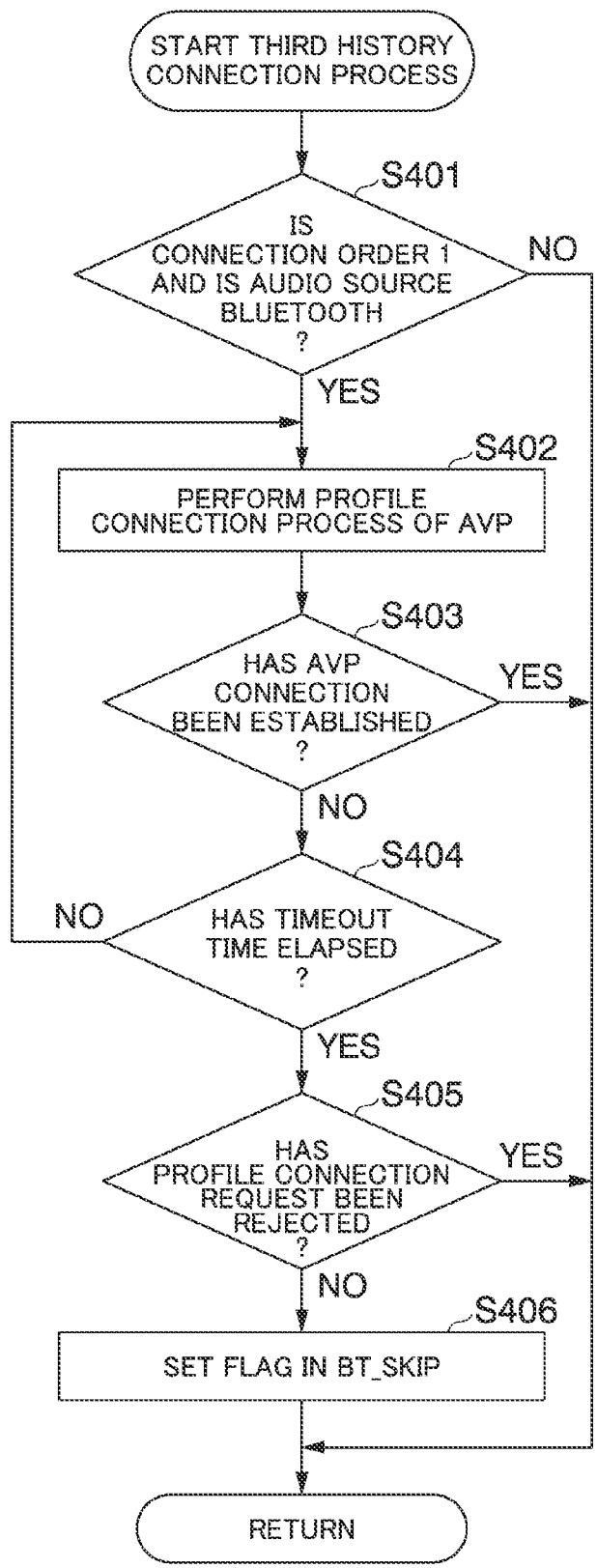
FIG. 7 is a flowchart showing a specific example of a third history connection process in the present embodiment.

FIG. 7 is a flowchart showing a specific example of the third history connection process in the present embodiment. As shown in FIG. 7, the third history connection process is part of the iterative processes that is performed for each target device in the first history connection process. First, the controller 201 determines whether the connection order of the target device is 1 and the current audio source of the on-vehicle device 200 is the BT (step S401). When it is determined in step S401 that the connection order of the target device is not 1 or the current audio source of the on-vehicle device 200 is not the BT, the controller 201 ends the third history connection process.

On the other hand, when it is determined in step S401 that the connection order of the target device is 1 and the current audio source of the on-vehicle device 200 is the BT, the controller 201 performs the AVP connection process for the target device (step S402) and determines whether the AVP connection has been established between the target device and the on-vehicle device 200 (step S403). When it is determined in step S403 that the AVP connection has been established between the target device and the on-vehicle device 200, the controller 201 ends the third history connection process.

On the other hand, when it is determined in step S403 that the AVP connection has not been established between the target device and the on-vehicle device 200, the controller 201 determines whether a predetermined timeout time has elapsed (step S404), and repeatedly performs step S402 and step S403 until the timeout time elapses. On the other hand, when it is determined in step S404 that the timeout time has elapsed, the controller 201 determines whether a profile connection request for the target device has been rejected in an AVP connection process (step S402) performed the most recently (step S405). This is an operation for confirming whether the reason why the AVP connection has not been established between the on-vehicle device 200 and the target device is due to the absence of the target device or the behavior of the target device at the time of executing the AVP connection process. Similar to the above, the rejection operation here also includes that a connection established once is disconnected by the target device.

When it is determined in step S405 that the profile connection request has not been rejected by the target device, that is, when the failure of the AVP connection establishment is due to the absence of the target device, it is expected that a subsequent profile connection process for the target device also fails. Therefore, in such a case, the controller 201 sets a flag in the BT_SKIP for the target device and then ends the third history connection process (step S406). Specifically, in such a case, the controller 201 sets the value of the BT_SKIP to 1.

On the other hand, when it is determined in step S405 that the profile connection request has been rejected by the target device, that is, when the failure of the AVP connection establishment with the target device is caused by the target device, there is a possibility that a subsequent profile connection process for the target device will succeed. Therefore, in such a case, the controller 201 ends the third history connection process without setting a flag in the BT_SKIP.

So far, the flow of the third history connection process has been described. Subsequently, the flow of the second history connection process will be described.

Figure 8:
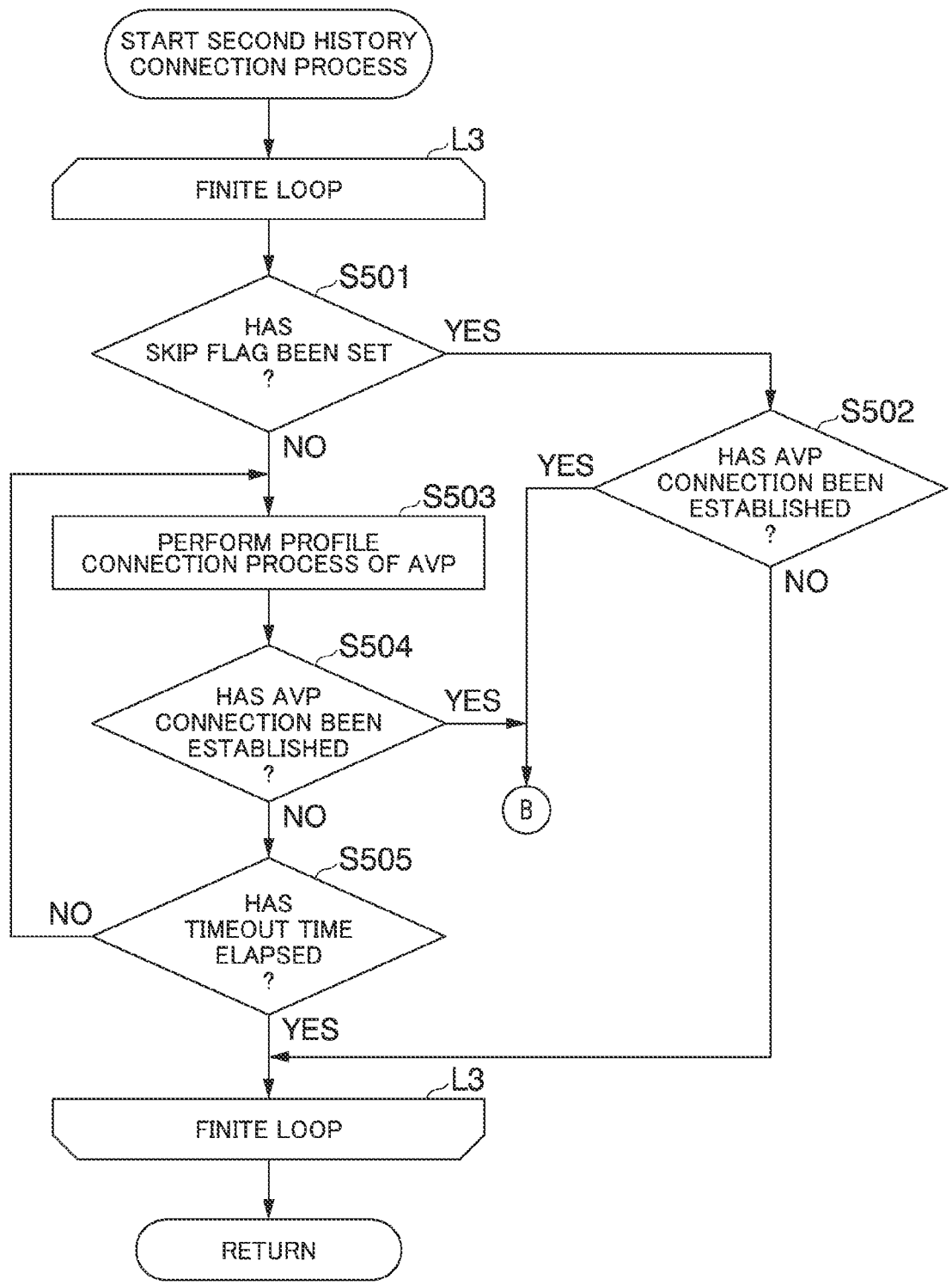
FIG. 8 is a flowchart showing a specific example of a second history connection process in the present embodiment.

FIG. 8 is a flowchart showing a specific example of the second history connection process in the present embodiment. As shown in FIG. 8, the second history connection process is a process in which iterative processes of step S501 to step S505 are performed sequentially from a target device with a fast connection order (finite loop L3). The target device of the second history connection process is a target device managed by the AVP group in the connection history management table.

First, the controller 201 determines whether a skip flag has been set for the target device (step S501). Specifically, the controller 201 determines that the skip flag has been set when one or both of the BT_SKIP and the USB_SKIP flags have been set, and determines that the skip flag has not been set when both of the BT_SKIP and the USB_SKIP flags have not been set.

When it is determined in step S501 that the skip flag has been set for the target device, the controller 201 determines whether the AVP connection has been established with the target device (step S502). When it is determined in step S502 that the AVP connection has been established with the target device, the controller 201 skips a subsequent profile connection process and ends the main process. A connection letter B in the drawing corresponds to the connection letter B in FIG. 3. On the other hand, when it is determined in step S502 that the AVP connection has not been established with the target device, the controller 201 skips a profile connection process for the target device, changes a processing target to a next target device and repeats the loop process.

When it is determined in step S501 that the skip flag has not been set for the target device, the controller 201 performs the AVP connection process for the target device (step S503) and determines whether the AVP connection has been established between the target device and the on-vehicle device 200 (step S504). When it is determined in step S504 that the AVP connection has been established between the target device and the on-vehicle device 200, the controller 201 ends the main process.

On the other hand, when it is determined in step S504 that the AVP connection has not been established between the target device and the on-vehicle device 200, the controller 201 determines whether a predetermined timeout time has elapsed (step S505), and repeatedly performs step S503 and step S504 until the timeout time elapses. On the other hand, when it is determined in step S505 that the timeout time has elapsed, the controller 201 changes a processing target to a next target device, and repeats the loop process.

When controlling the profile connection process of a peripheral device by the history connection, the on-vehicle device 200 of the embodiment configured as described above can set a skip flag in a target device according to the connection status with the peripheral device (for example, the status of the USB connection), the execution result of the profile connection, and the like and skip part or the whole of a profile connection process, which is performed for the target device, according to the value of the skip flag. By employing such a configuration, the on-vehicle device 200 can restrain the time required for establishing the profile connection with the target device from becoming long.

In the present embodiment, a case, where in the history connection, the on-vehicle device 200 performs the AVP connection process after the HFP connection process, has been described; however, the on-vehicle device 200 may be configured to perform the HFP connection process after the AVP connection process. In such a case, the on-vehicle device 200 may be configured to replace the AVP with the HFP and replace the HFP with the AVP in the aforementioned history connection process. The on-vehicle device 200 may be configured to alternately perform the AVP connection process and the HFP connection process.

In the present embodiment, a case, where in the history connection, the on-vehicle device 200 performs the profile connection process (priority connection process) of a pre-registered priority device and then performs the history connection process of a target device, has been described; however, the on-vehicle device 200 may be configured not to perform the priority connection process, or configured to perform the priority connection process independently of the history connection process.

In the present embodiment, a case, where in the history connection, the on-vehicle device 200 determines whether to skip the profile connection process by using the two types of skip flags of BT_SKIP and USB_SKIP, has been described; however, the on-vehicle device 200 may be configured to determine whether to skip the profile connection process by using either the BT_SKIP or the USB_SKIP.

The on-vehicle device 200 of the present embodiment may be configured to perform data communication simultaneously with communication of the AVP. For example, an example of the data communication includes transmission, reception, and the like of phone book data by the PBAP.

In the present embodiment, a flag is set in the USB_SKIP for a BT device whose USB connection with the on-vehicle device 200 is disconnected, but this is because the user of the BT device will be unlikely to intentionally disconnect the USB connection and switch the USB connection to the BT connection as described above. For the same reason, it is conceivable that the user of the BT device will be unlikely to disconnect a connection with a profile and immediately re-establish a connection with the same profile. Therefore, when such a situation is expected, the controller 201 may be configured to set a flag in the BT_SKIP for the BT device whose BT connection has been disconnected.

The aforementioned embodiment can be represented as follows.

An on-vehicle device includes a storage device that stores a program and a hardware processor, and the hardware processor executes the program stored in the storage device, thereby allowing a computer, which serves as an on-vehicle device connectable to a pre-registered peripheral device by Bluetooth, to, based on management information of a first execution order that is an execution order of an HFP connection process of attempting to establish an HFP connection to the peripheral device and a second execution order that is an execution order of an AVP connection process of attempting to establish an AVP connection to the peripheral device, perform a control process of performing the HFP connection process in the first execution order and performing the AVP connection process in the second execution order, and, when a connection with a certain peripheral device is not established within a predetermined time in one of the HFP connection process and the AVP connection process in the control process and the peripheral device is managed as an execution target of the other connection process in the management information, determine whether to restrain the execution of the other connection process for the peripheral device thereafter.

Although a mode for carrying out the present invention has been described using the embodiments, the present invention is not limited to these embodiments and various modifications and substitutions can be made without departing from the spirit of the present invention.

What is claimed is:

1. A control method, in which a computer serving as an on-vehicle device connectable to pre-registered peripheral devices by Bluetooth executes a program, comprising steps of:

performing a control process of performing a hands free profile (HFP) connection process for peripheral devices in a first execution order and performing an audio video profile (AVP) connection process for peripheral devices in the second execution order based on a management information of the first execution order and the second execution order, wherein the on-vehicle device attempts to establish an HFP connection with each of the peripheral devices in the respective HFP connection processes and to establish an AVP connection with each of the peripheral devices in the respective AVP connection processes;

determining whether or not to restrain execution of the HFP connection process for a certain peripheral device after a certain AVP connection process for the certain peripheral device when the certain AVP process in which a connection with the certain peripheral device is not established within a predetermined time has elapsed in the control process and the certain peripheral device is managed as an execution target of the HFP connection process in the management information; and determining whether or not to restrain execution of the AVP connection process for a certain peripheral device after a certain HFP connection process for the certain peripheral device when the certain HFP process in which a connection with the certain peripheral device is not established within a predetermined time has elapsed in the control process and the certain peripheral device is managed as an execution target of the AVP connection process in the management information.

2. The control method according to claim 1, wherein the on-vehicle device determines whether or not to restrain the execution of the AVP connection process, based on a behavior of the peripheral device at the time of execution of an HFP connection process that has failed to establish a connection, and whether or not to restrain the execution of the HFP connection process, based on a behavior of the peripheral device at the time of execution of an AVP connection process that has failed to establish a connection.

3. The control method according to claim 2, wherein, when there is no response from a peripheral device having attempted a connection at the time of the execution of the HFP connection process that has failed to establish the connection, the on-vehicle device determines to restrain the execution of the AVP connection process for the peripheral device thereafter, and when a connection is rejected by the peripheral device or a connection established once is disconnected by the peripheral device at the time of the execution, the on-vehicle device determines not to restrain the execution of the AVP connection process thereafter, and there is no response from a peripheral device having attempted a connection at the time of the execution of the AVP connection process that has failed to establish the connection, the on-vehicle device determines to restrain the execution of the HFP connection process for the peripheral device thereafter, and when a connection is rejected by the peripheral device or a connection established once is disconnected by the peripheral device at the time of the execution, the on-vehicle device determines not to restrain the execution of the HFP connection process thereafter.

4. The control method according to claim 1, wherein the on-vehicle device repeatedly performs the HFP connection process for a plurality of peripheral devices in an execution order managed by the management information, and releases restraint of the execution of the AVP connection process every cycle of the repetition, and the on-vehicle device repeatedly performs the AVP connection process for a plurality of peripheral devices in an execution order managed by the management information, and releases restraint of the execution of the HFP connection process every cycle of the repetition.

5. The control method according to claim 4, wherein the on-vehicle device performs the AVP connection process subsequent to the HFP connection process for a peripheral device, which first performs the HFP connection process, in each cycle of the repetition, or performs the HFP connection process subsequent to the AVP connection process for a peripheral device, which first performs the AVP connection process, in each cycle of the repetition.

6. The control method according to claim 1, wherein the on-vehicle device further comprises a universal serial bus (USB) connector that is connected to the peripheral device by USB, and in a case where a connection with a peripheral device by the USB connector is disconnected, when the peripheral device has been registered in the management information as an execution target of at least one of the HFP connection process and the AVP connection process, the on-vehicle device restrains execution of at least one of the HFP connection process and the AVP connection process, which is to be executed, thereafter.

7. The control method according to claim 1, wherein an execution order of the HFP connection process and the AVP connection process is managed in the order of peripheral devices whose connection history with the on-vehicle device is new.

8. An on-vehicle device, which is connectable to pre-registered peripheral devices by Bluetooth, comprising:

a storage device that stores a program; and
a hardware processor,
wherein the hardware processor executes the program stored in the storage device, thereby allowing the on-vehicle device to,
perform a control process of performing a hands free profile (HFP) connection process for peripheral devices in a first execution order and perform an audio video profile (AVP) connection process for peripheral devices in the second execution order based on a management information of the first execution order and the second execution order, wherein the on-vehicle device attempts to establish an HFP connection with each of the peripheral devices in the respective HFP connection processes and to establish an AVP connection with each of the peripheral devices in the respective AVP connection processes, determine whether or not to restrain execution of the HFP connection process for a certain peripheral device after a certain AVP connection process for the certain peripheral device when the certain AVP process in which a connection with the certain peripheral device is not established within a predetermined time has elapsed in the control process and the certain peripheral device is managed as an execution target of the HFP connection process in the management information; and determine whether or not to restrain execution of the AVP connection process for a certain peripheral device after a certain HFP connection process for the certain peripheral device when the certain HFP process in which a connection with the certain peripheral device is not established within a predetermined time is occurred in the control process and the certain peripheral device is managed as an execution target of the AVP connection process in the management information.

9. A non-transitory computer readable storing medium storing a program causing a computer serving as an on-vehicle device connectable to pre-registered peripheral devices by Bluetooth to:

perform a control process of performing a hands free profile (HFP) connection process for peripheral devices in a first execution order and perform an audio video profile (AVP) connection process for peripheral devices in the second execution order based on a management information of the first execution order and the second execution order, wherein the on-vehicle device attempts to establish an HFP connection with each of the peripheral devices in the respective HFP connection processes and to establish an AVP connection with each of the peripheral devices in the respective AVP connection processes;

determine whether or not to restrain execution of the HFP connection process for a certain peripheral device after a certain AVP connection process for the certain peripheral device when the certain AVP process in which a connection with the certain peripheral device is not established within a predetermined time has elapsed in the control process and the certain peripheral device is managed as an execution target of the HFP connection process in the management information; and determine whether or not to restrain execution of the AVP connection process for a certain peripheral device after a certain HFP connection process for the certain peripheral device when the certain HFP process in which a connection with the certain peripheral device is not established within a predetermined time has elapsed in the control process and the certain peripheral device is managed as an execution target of the AVP connection process in the management information.

\* \* \* \* \*